(12) United States Patent
Seymour

(10) Patent No.: US 10,653,271 B2
(45) Date of Patent: May 19, 2020

(54) ARTICULABLE HEATED COOKING SURFACE WITH FLUID MANAGEMENT AND SAFETY INTERLOCKS

(71) Applicant: National Presto Industries, Inc., Eau Claire, WI (US)

(72) Inventor: Justun Seymour, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 496 days.

(21) Appl. No.: 15/330,965

(22) Filed: Jan. 19, 2017

(65) Prior Publication Data

US 2018/0199757 A1 Jul. 19, 2018

(51) Int. Cl.
*A47J 37/07* (2006.01)
*A47J 37/06* (2006.01)

(52) U.S. Cl.
CPC .................. *A47J 37/0676* (2013.01)

(58) Field of Classification Search
CPC ........... A47J 37/0763; A47J 2037/0777
See application file for complete search history.

(56) References Cited

U.S. PATENT DOCUMENTS

| 1,505,675 | A | * | 8/1924 | Stirn | A47J 37/10 |
| | | | | | 126/215 |
| 1,904,925 | A | * | 4/1933 | Perks | A47J 37/10 |
| | | | | | 126/215 |
| 1,934,119 | A | * | 11/1933 | Esposito | A47B 3/0812 |
| | | | | | 108/130 |
| 2,372,077 | A | * | 3/1945 | Glinecki | A47B 97/08 |
| | | | | | 206/1.7 |
| 3,003,410 | A | | 10/1961 | Shaw et al. | |
| 3,081,395 | A | * | 3/1963 | Wickenberg | A47J 37/101 |
| | | | | | 219/441 |
| 3,086,448 | A | * | 4/1963 | Forman | A47J 37/10 |
| | | | | | 126/373.1 |
| 3,744,475 | A | * | 7/1973 | Myler | A47J 27/14 |
| | | | | | 126/39 R |
| 3,927,610 | A | * | 12/1975 | Minsky | A47J 37/10 |
| | | | | | 99/425 |
| 4,103,626 | A | * | 8/1978 | Barricks | A47B 3/0912 |
| | | | | | 108/127 |
| 5,333,540 | A | * | 8/1994 | Mazzocchi | A47J 37/0763 |
| | | | | | 126/25 R |
| D436,796 | S | | 1/2001 | Kalina et al. | |
| 8,668,949 | B2 | * | 3/2014 | Wilson | A47J 33/00 |
| | | | | | 126/9 B |

(Continued)

*Primary Examiner* — Dana Ross
*Assistant Examiner* — Lawrence H Samuels
(74) *Attorney, Agent, or Firm* — Schwegman Lundberg & Woessner, P.A.

(57) ABSTRACT

A cooking plate having a cooking surface, in one embodiment, two folding legs and a drip tray. The legs include a recess and the tray includes a sloped land. When the legs are folded into a storage position, the tray is prevented from sliding by the interlock between the land and recess. In a second embodiment, the legs including a tilting/lifting member which is pivotally moveable from a planar position on the leg member surface to a lifting position with a portion of the lifting member being longer than the height of the folding legs. The lifting member portion rests against the folding leg in an over-center splayed angle abutting the folding let to create a stable lifting leg.

20 Claims, 38 Drawing Sheets

(56) References Cited

U.S. PATENT DOCUMENTS

| | | | |
|---|---|---|---|
| 2005/0139086 A1* | 6/2005 | McHutchison | A47J 37/0611 99/389 |
| 2005/0247210 A1* | 11/2005 | Ragan | A47J 37/0611 99/372 |
| 2007/0204863 A1* | 9/2007 | Sie | A47J 37/0676 126/9 R |
| 2008/0017047 A1* | 1/2008 | Stanczak | A47J 37/108 99/357 |
| 2011/0011277 A1* | 1/2011 | Bond | A47J 37/0611 99/375 |
| 2012/0070556 A1* | 3/2012 | Wilson | A47J 33/00 426/523 |
| 2012/0237647 A1* | 9/2012 | Dobert | A47J 37/0682 426/243 |
| 2015/0136111 A1* | 5/2015 | Bizal | A47J 37/0763 126/25 R |
| 2018/0279770 A1* | 10/2018 | Crowe | A47B 9/16 |

* cited by examiner (back view)

(front view)

ARTICULABLE HEATED COOKING SURFACE WITH FLUID MANAGEMENT AND SAFETY INTERLOCKS

FIELD OF THE DISCLOSURE

The present invention cooking implements, more particularly a heated portable cooking surface, such as a planar griddle.

BACKGROUND

Cooking appliances, particularly self-contained electrically heated cooking surfaces, commonly referred to as electric griddles, or grills have been in use for some time. Examples in the prior art are: U.S. Design No. D436,796 and U.S. Pat. No. 3,003,410. The typical construction of a planar griddle is a flat cooking surface and legs or a base to maintain the heated element above a table or other work surface.

Because such cooking surfaces are often used for cooking meats or other products which generate fluids, most often oils, during cooking, it is desirable to remove the fluids during the cooking process to minimize spatter. Since the cook surface is very hot, it is safer to constantly remove during the cooking process instead of at the end, there is a need to provide flow control for the fluids, to direct them to a safe reservoir.

After usage, it is beneficial to be able to fold the unit for compact storage.

Each of these requirements and the combination of hem create challenges in providing a unitary compact and safe structure.

The present disclosure addresses each of these challenges in a synergistic way.

BRIEF SUMMARY

To assist the reader in preparing to digest the detailed description and claims below, a short summary has been provided. It is far from complete and only provides a glimpse of the invention concepts. It is not intended to define the scope of the invention. The claims perform that function.

The present disclosure shows a stand-alone, typically electric, cook surface which has supporting legs, which are foldable to create a compact device for storage. There is also disclosed a lifting mechanism which allows the cook surface to be operated at an angle to ensure that cooking oils will be constantly drained away during cooking. A reservoir may be provided within the device itself to collect such oils. The reservoir may be removable to allow disposal of the collected oils, but it may also include an interlock to keep it safely within the unit when the lifting legs are folded way for storage so that no parts of the device will fall out.

There is also disclosed a cooktop having any or all of the following elements: a cooking surface having a top surface, an underside and having front, rear, left and right edges; a left and right support leg being connected to said left and right edges respectively and being moveable between an upright in-use position and a folded under storage position, at least one of said legs being hingeably connected to an edge such that when moved between said in-use and folded under positions its distal edge scribes an arc; a tray having left and right sides and being slideably attached to said underside; said tray including at least one protruding land extending away from said tray in the direction of one of the edges; said land having a distal apex then sloping away therefrom toward the tray; at least one of said legs being foldable under said cooking surface toward said tray; said at least one leg having a recess sized to receive and engage at least said distal end of said land when said tray is in said storage position and said leg is in its folded under position; wherein said distal end of said land is received within and confined by said recess when said at least one leg is rotated through said arc into said folded under position, thereby substantially immobilizing said tray from removal when said distal end of said land is received in said recess.

There is also disclosed a cooktop wherein said land follows a slope generally equal to the arc of the distal end of the at least one leg.

There is also disclosed a cooktop wherein said land follows a curved slop from said apex to the tray.

There is also disclosed a cooktop wherein both legs include a land and wherein said lands engage said tray on both sides thereof.

There is also disclosed a cooktop wherein said tray includes horizontal flanges on left and rights sides and wherein the underside of said cooking surface includes recesses for receiving said flanges.

There is also disclosed a cooktop having any or all of the following elements: a generally planar cooking surface having a top surface, an underside and having front, rear, left and right edges; a left and right support leg members having front and rear legs of predetermined height and a leg surface joining the two legs, said members being connected to said left and right edges respectively; at least one of leg surfaces including a tilting structure for elevating one edge of the cooking surface; said tilting structure including any or all of the following elements: an aperture in said leg surface proximate said rear edge; a lifting arm having a pivot point defining first and second portions of said lifting arm, said arm being sized to fit within said aperture and rotatable between a storage position and a lifting position; said storage position defined as said lifting arm being generally coplanar with said leg surface and said lifting position being where the second portion is generally proximate the rear leg; said first portion of said lifting arm having an extension tab which extends beyond said leg surface when said leg surface is in storage position; said second portion being longer that said predetermined height, so that when said second portion is in a tilting position, it is proximate said rear leg, it raises the cooking surface off its rear leg and onto said second portion; so that the cooking surface is thereby tilted.

There is also disclosed a cooktop wherein said second portion abuts said rear leg when in said tilting position.

There is also disclosed a cooktop wherein said second portion is non-orthogonal to the cooking surface when in said tilting position.

There is also disclosed a cooktop wherein said second portion is in an oblique splayed angle when in said tilting position.

There is also disclosed a cooktop wherein said second portion is splayed when in said tilting position.

There is also disclosed a cooktop wherein said lifting arm is securing into is storage position by lands extending from said tilting surface.

There is also disclosed a method of securing a tilting cooking surface of a cooktop having a pair of legs members on the edges of a cooking surface, the leg members having front and rear legs and having a pivoting tilting member capable of moving from a storage position to a lifting position, comprising any or all of the following steps in any order: configuring the rear legs so that they are splayed; configuring the range of rotation of said lifting member so that when it is said lifting member is in the lifting position, it abuts said splayed legs thereby providing a secure stop for the pivoting motion of the tilting member.

There is also disclosed a method further including a drip tray slideably engaged with an underside of the cooking surface and further including any or all of the following steps in any order: configuring the tray to engage a portion of leg members when in their storage position so that said tray may not be removed from the cooking surface when the leg members are in said storage position.

DETAILED DESCRIPTION

The following description and associated drawings are intended to give the reader a detailed view of one or more embodiments of the concepts of the invention. The scope of the invention is however defined by the claims and equivalents of the elements within the claims.

Figure 1:
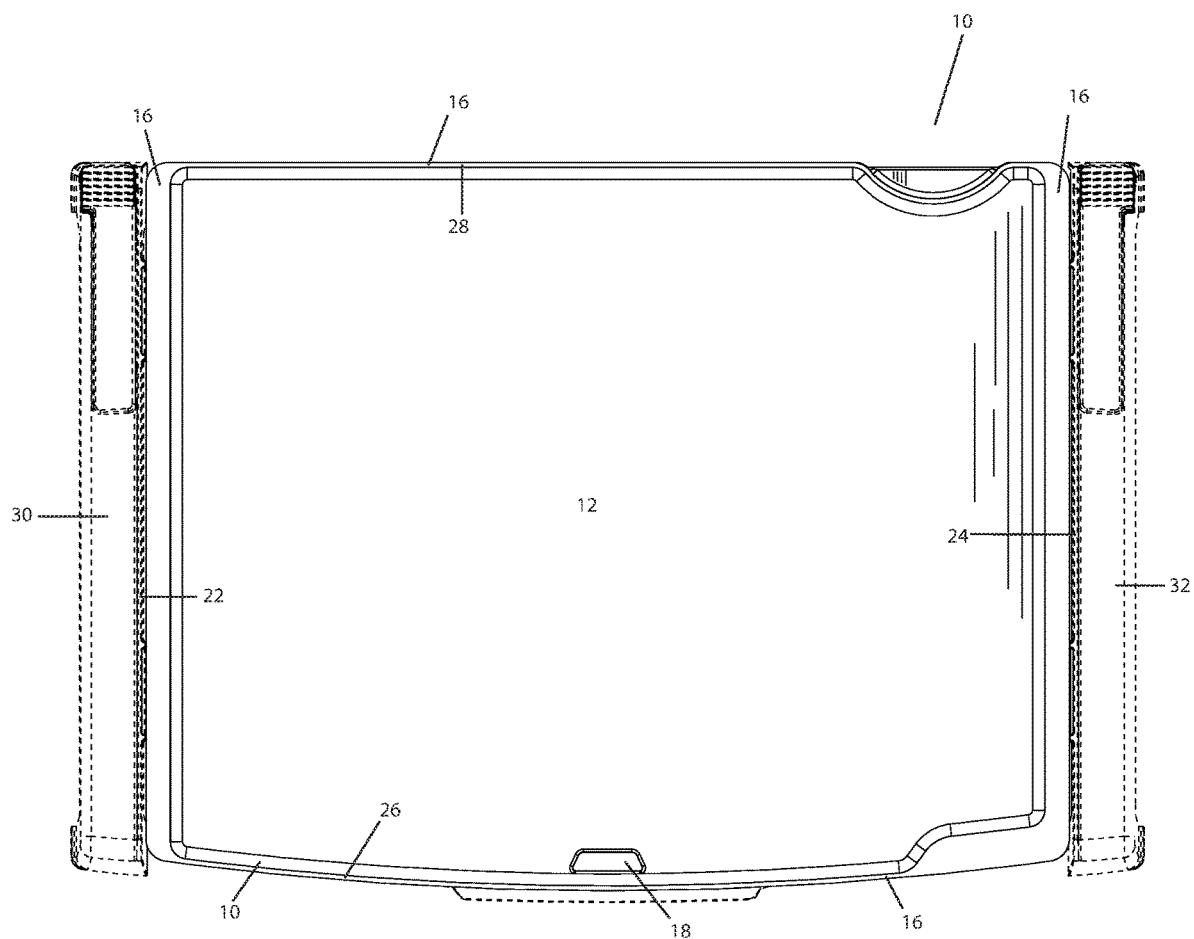
FIG. 1 is a top plan view of a portable cooking surface.

FIG. 1 illustrates a top view of the portable cooktop 10, also referred to as a griddle. It is preferably electrically heated, but other options are possible. The cooking surface 12 is preferably planar and may be recessed as shown with a raised lip 16 surrounding its periphery as a barrier to the flow of oils or other cooking fluids, or alternatively, lip 16 may itself be a recess which channels such fluids away from the cooking surface 12. In either case, a drain port 18 is preferably provided proximate an edge of the cooking surface. In this case, the preferred edge is the front-most and the port opens into a drip tray 40 (FIG. 2) which will be described later. If instead of a lip 16, there is a fluid channel, then the drain would be in that channel. The drain could also be located in a corner of the cooking surface if one only one of the leg lifts (described later) is used. The preferred shape of the lip or channel 16 adjacent the drain is concave or otherwise formed to drain toward the port.

The cooking surface is bounded by left and right edges 22, 24 and front and rear edges 26, 28. A pair of leg units 30, 32 are hingeably attached to the left and right edges and provide support for the cooking surface by raising it above a working surface because of the heat generated.

Figure 2:
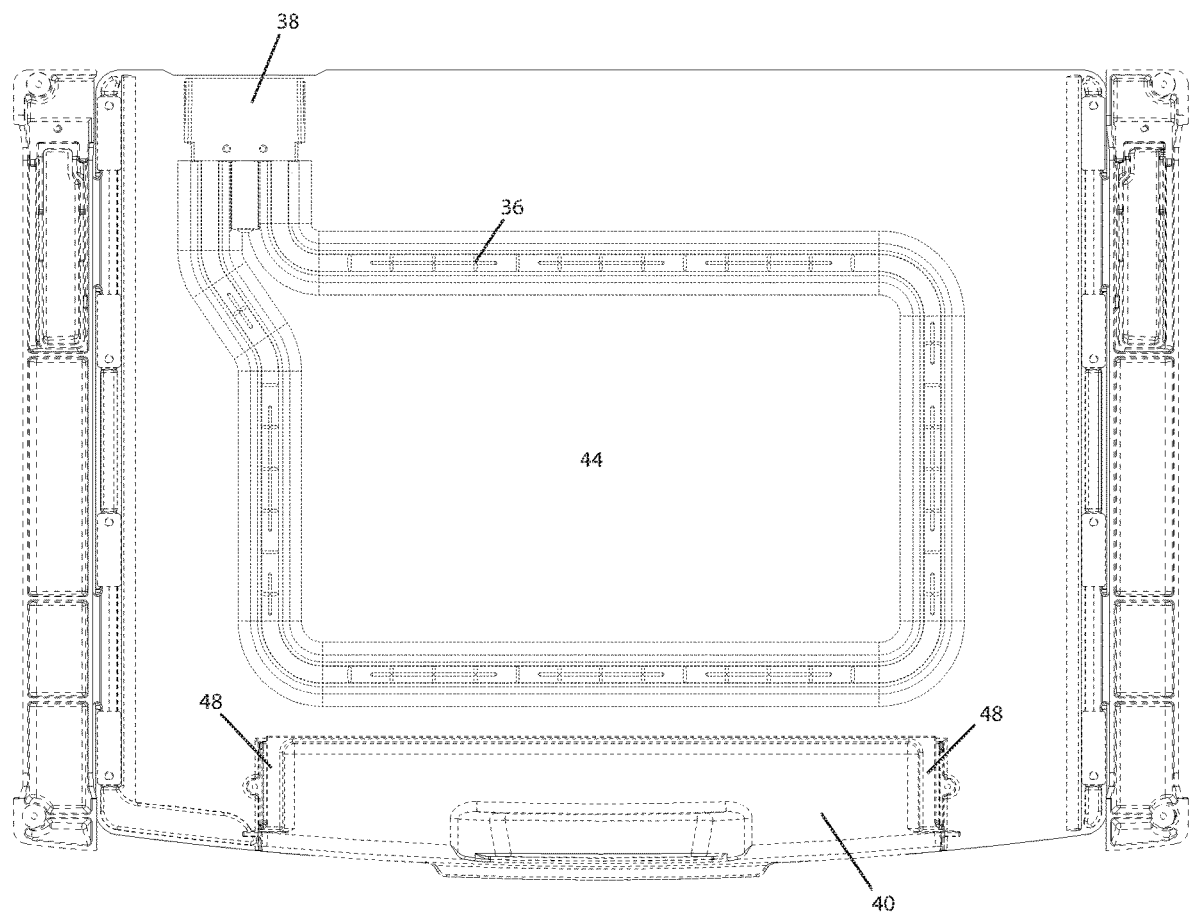
FIG. 2 is a bottom plan view of FIG. 1.

FIG. 2 illustrates the bottom of the cooktop. An electric heating element 36 is attached to the underside 44 of the cooking surface. An electrical connector port 38 may be provided with a further electrical supply cable and thermostat as known in the art.

Figure 12:
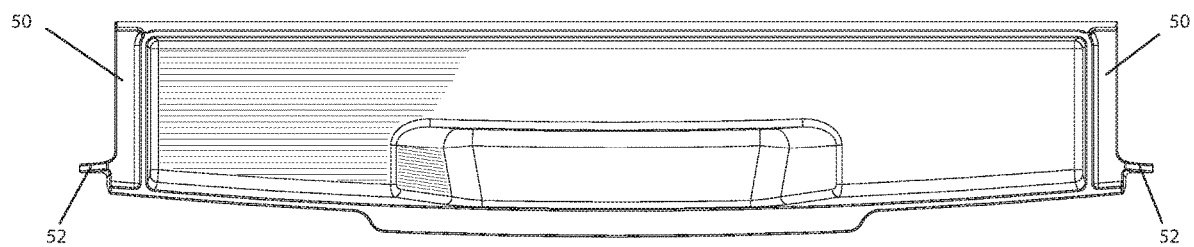
FIG. 12 is a top plan view of the tray in FIG. 11.
Figure 13:
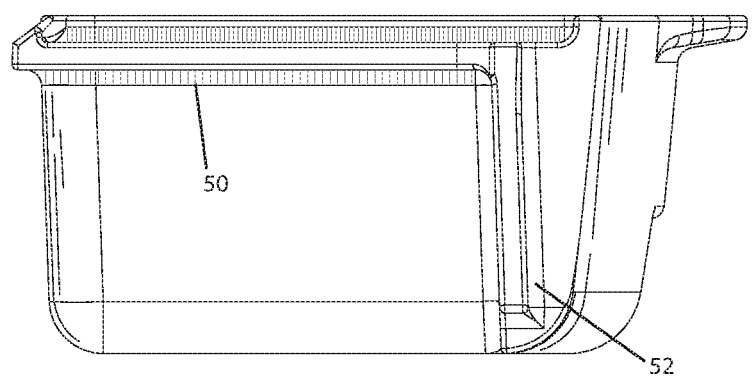
FIG. 13 is a side plan view of the tray in FIG. 11.
Figure 14:
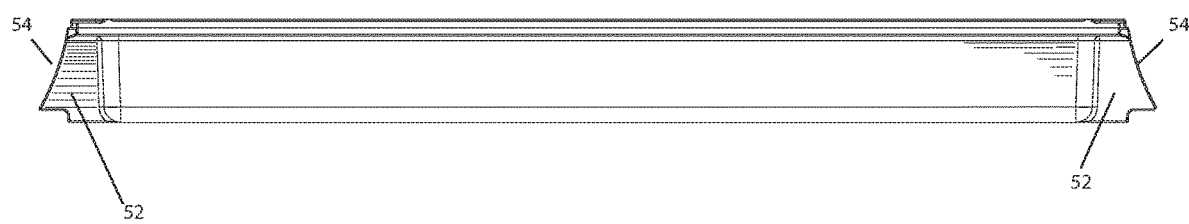
FIG. 14 is a rear plan view of the tray in FIG. 11.
Figure 15:
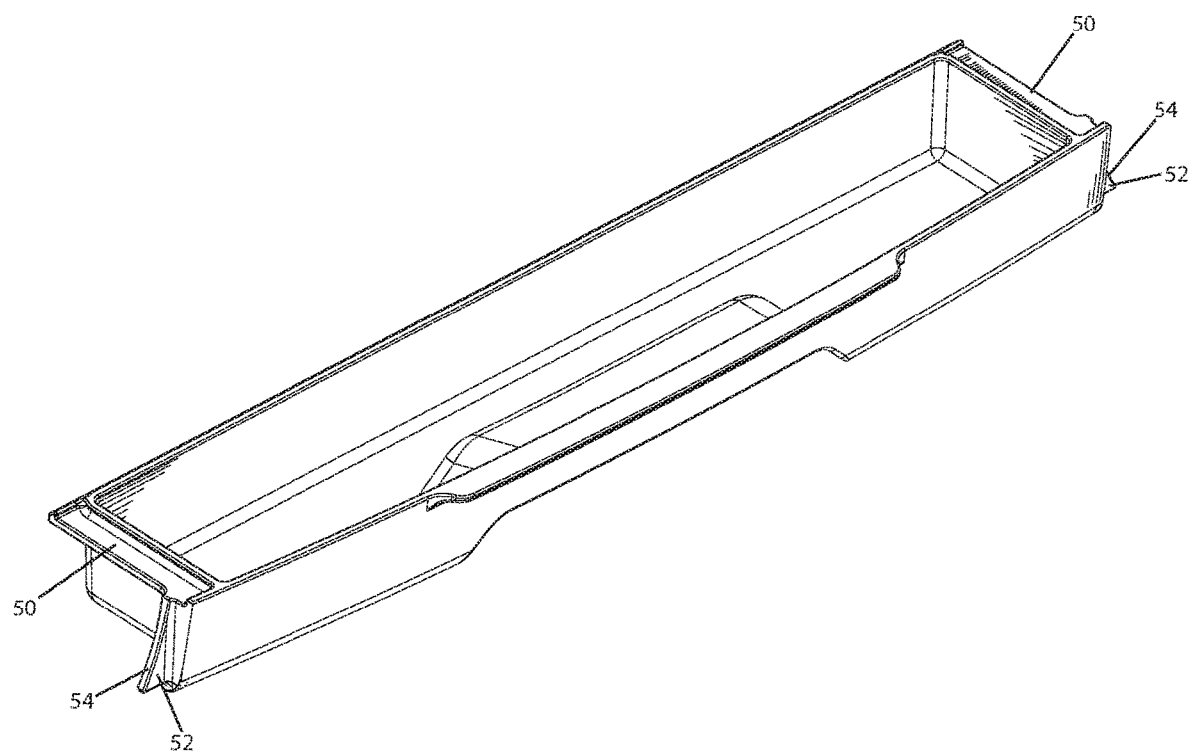
FIG. 15 is a top perspective view of the tray in FIG. 11.
Figure 16A:
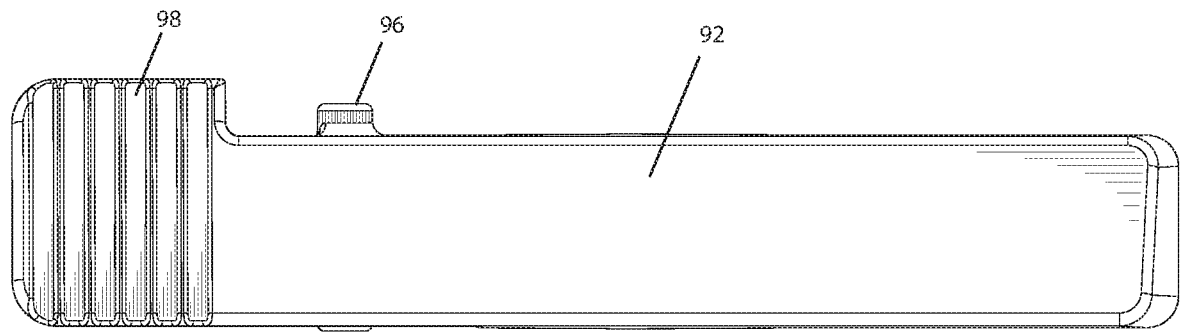
FIGS. 16a and 16b are top and bottom plan views of the lift lever.
Figure 16B:
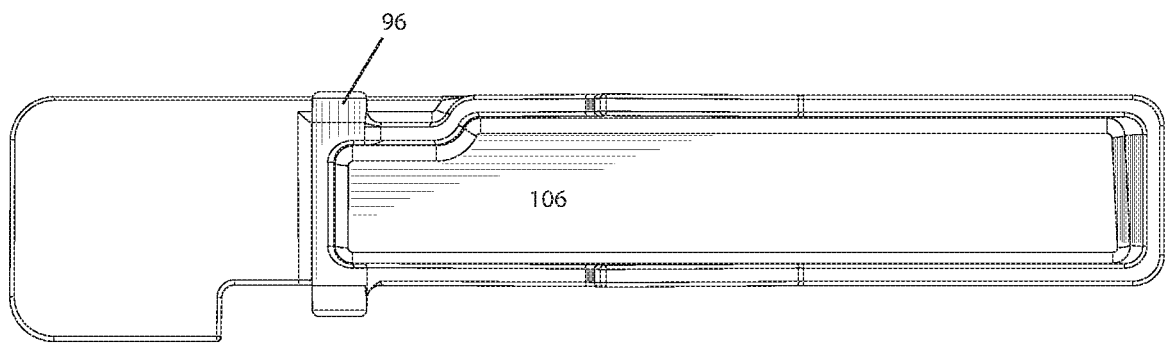

A drip tray 40 is slideably affixed to the underside 44 by the engagement of a set of left and right orthogonally extending lands or projections 50. (See FIG. 15 for a perspective but also FIGS. 12-13). The tray provides a catch for fluids which accumulate on the cooking surface. By removing the fluids, they are removed so that they don't overheat or smoke. It also makes the cooking process more healthful. Tray 40 is retained in a gap formed between underside 44 and a pair of left and right retainer bars 48 which are removably affixed to the underside but spaced apart therefrom. The bars and underside define a receiving rail sized to receive said lands and maintain the tray slideable and just under the cooking surface. The front portion of the bars may be curved downwardly to afford easy insertion of the projections. The bars may also include waves or orthogonal projections/ridges along its length to provide some resistance to rapid removal of the tray. Other mechanisms to prevent the tray from slipping out may be provided in addition to the interlock system discussed herein.

Figure 3:
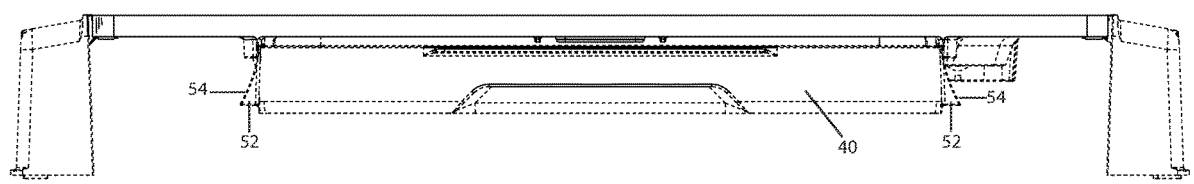
FIG. 3 is a front plan view of FIG. 1.
Figure 4:
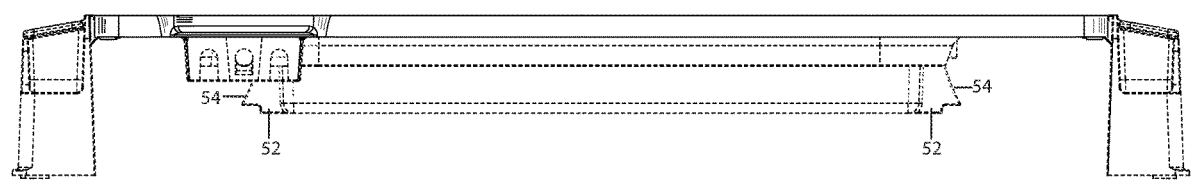
FIG. 4 is a rear plan view of FIG. 1.
Figure 5:
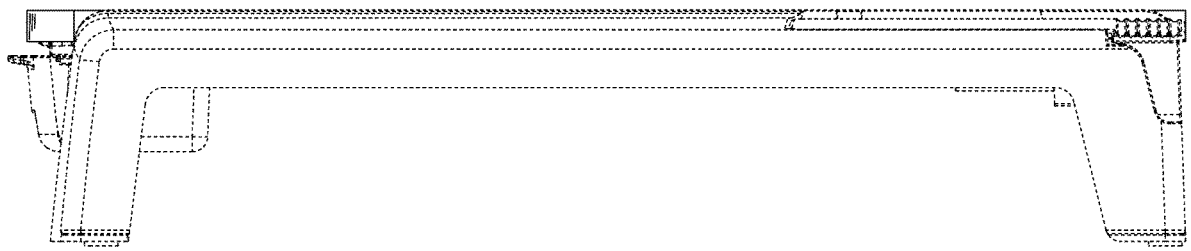
FIG. 5 is a side plan view of FIG. 1, the sides being substantially mirror images.

As seen in FIG. 3, tray 40 has a pair of flanges 52 extending orthogonally from the left and right edges of the tray (or generally in parallel with the front face of the tray). These are used in conjunction with interlock between the tray and folding legs 30, 32. Flanges 52 preferably include a sculpted distal peripheral edge 54. This edge preferably follows an arcuate path from a distal most point and sloping downwardly toward the left and right edges of the tray, respectively. The slope may be a straight line linear edge or a convex edge. The arcuate is preferred because it allows the folding leg which has a recessed area therein, to receive the flanges without interference until both the tray and legs are in their storage positions with the front face of the tray being generally coplanar with a portion of the legs.

Figure 22:
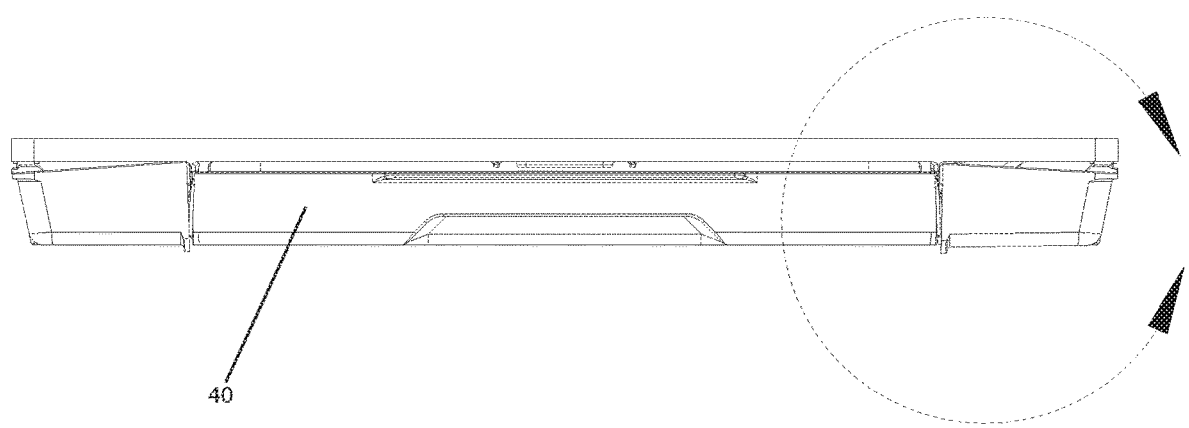
FIG. 22 is a front plan similar to FIG. 3 but with legs folded under.
Figure 23:
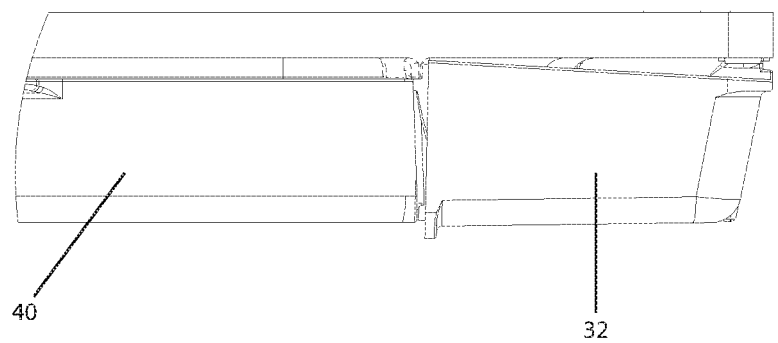
FIG. 23 is a close up view of a portion of FIG. 22.
Figure 24:
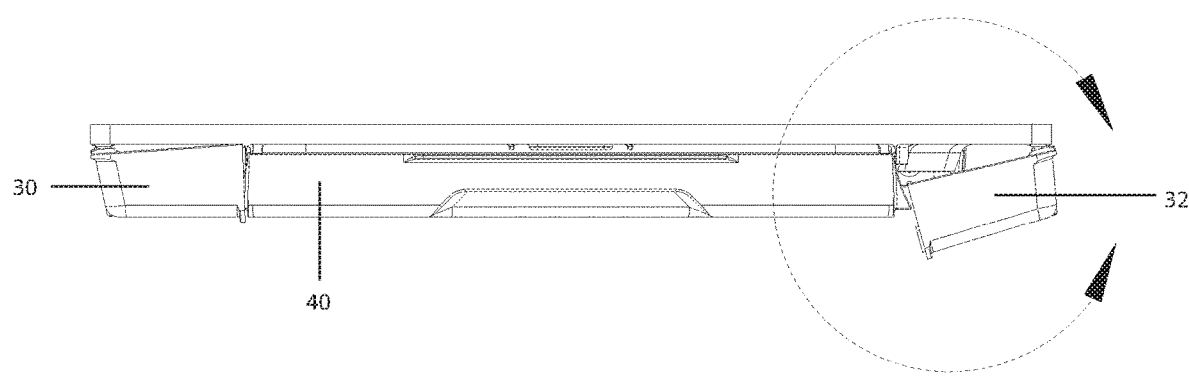
FIG. 24 is a view like FIG. 22 except one leg is partially unfolded.
Figure 25:
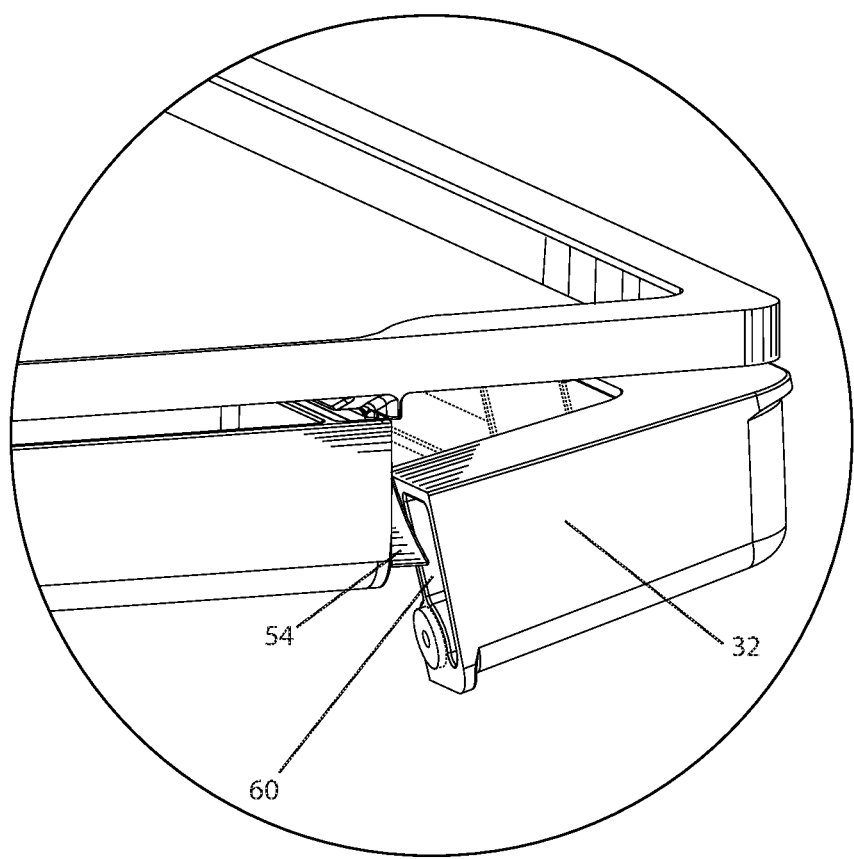
FIG. 25 is a close up view of FIG. 24 looking into the leg.
Figure 26:
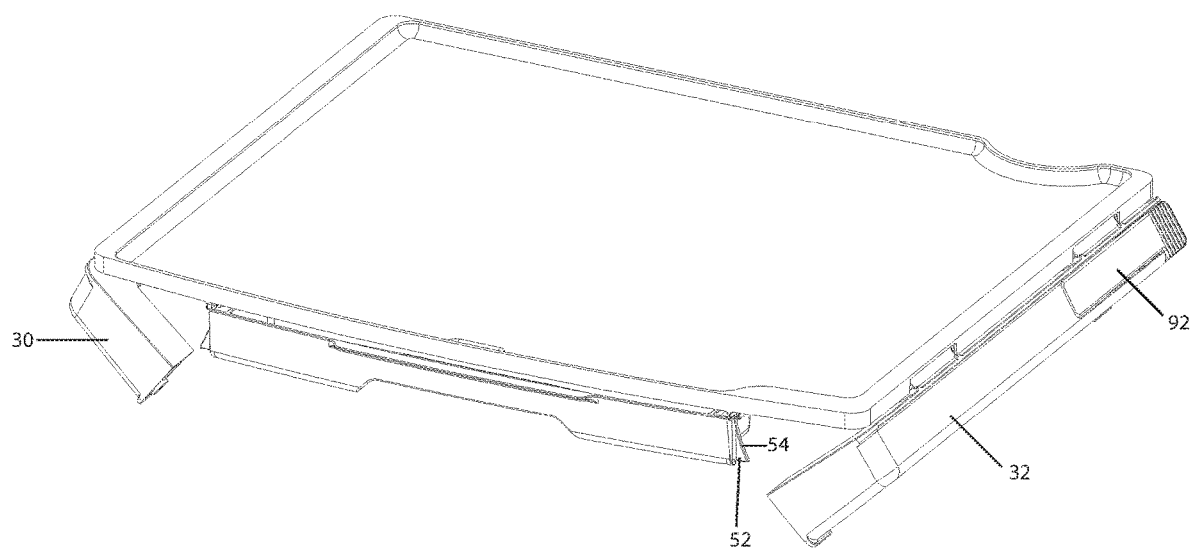
FIG. 26 is a perspective view of FIG. 1 but with the legs partially folded.
Figure 27:
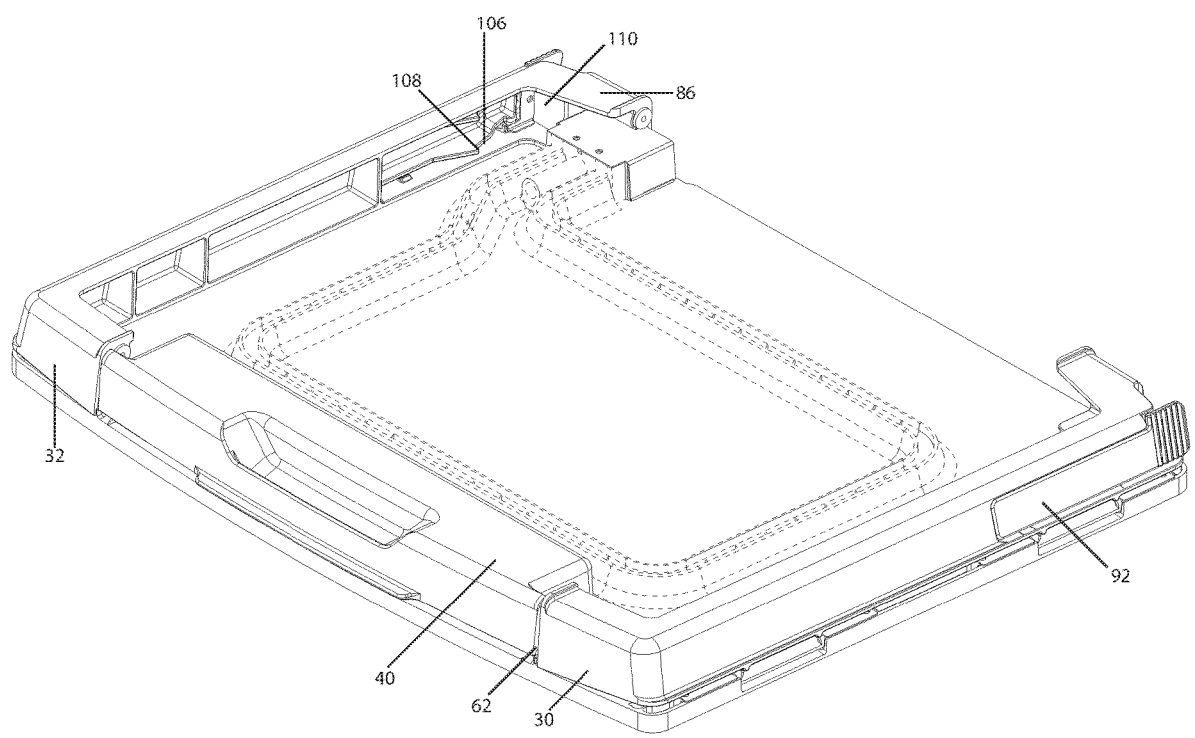
FIG. 27 is a bottom perspective view of FIG. 2 but with legs folded under.
Figure 28:
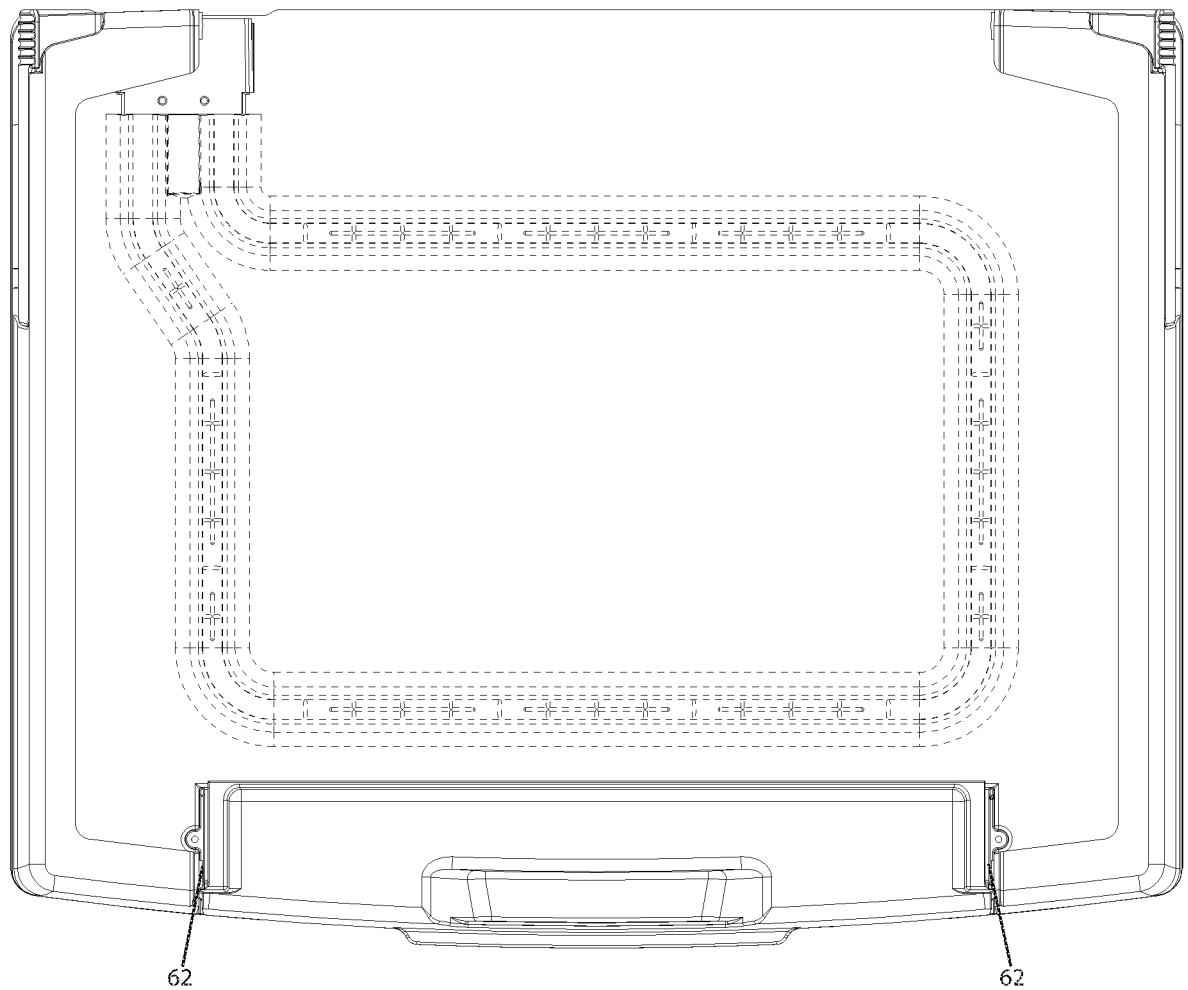
FIG. 28 is a bottom plan view of FIG. 27.

FIGS. 21-26 and 36a, b, c, d, e, illustrate the interlock between the legs and tray. In FIG. 25 it can be seen in close up that leg 32 rotates on its hinges to a storage position adjacent to the bottom of the cooking surface (FIG. 22 shows the storage position). To get into that position and secure tray 40, the projection 52 with sloped edge 54 must not engage legs 30/32 when folding. Rather, legs 30/32 include a recess sized to receive projection 52 and the leading edge 54 is formed to scribe an arc which will engage recess/receiver 60 in the leg without contacting any part of the leg during its rotation into storage position. By use of this sloping shape, the distal end of edge 54 can be nearly, but not touching, the leg during the parking from use to storage position. This can provide fit between the parked leg and tray with a minimum of gap space 62.

Figure 7:
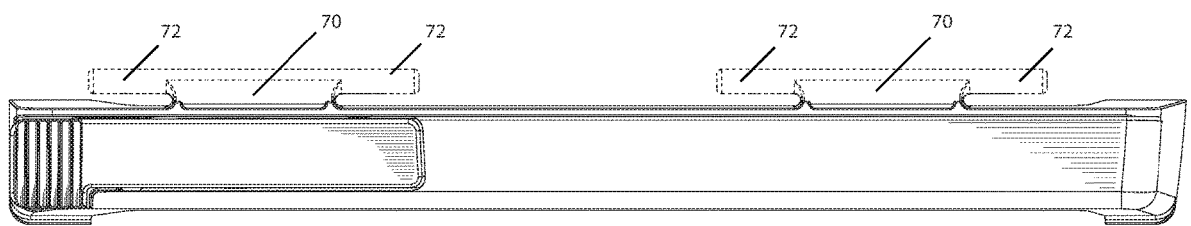
FIG. 7 is a partial top view with portions broken away along lines 7-7 of FIG. 6.
Figure 8:
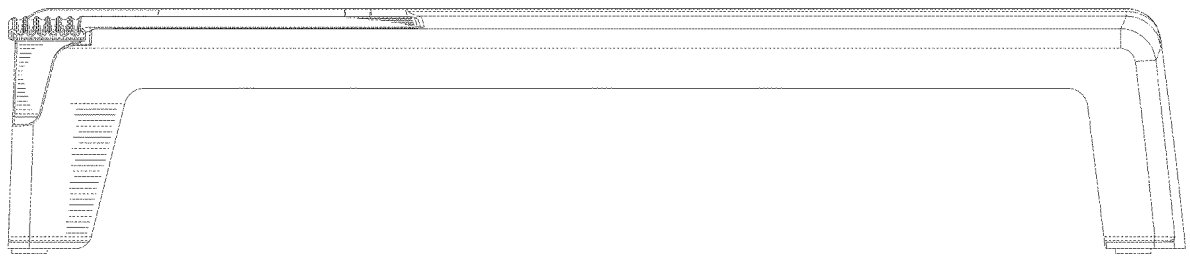
FIG. 8 is a side elevational view like FIG. 5 except with portions broken away.
Figure 9:
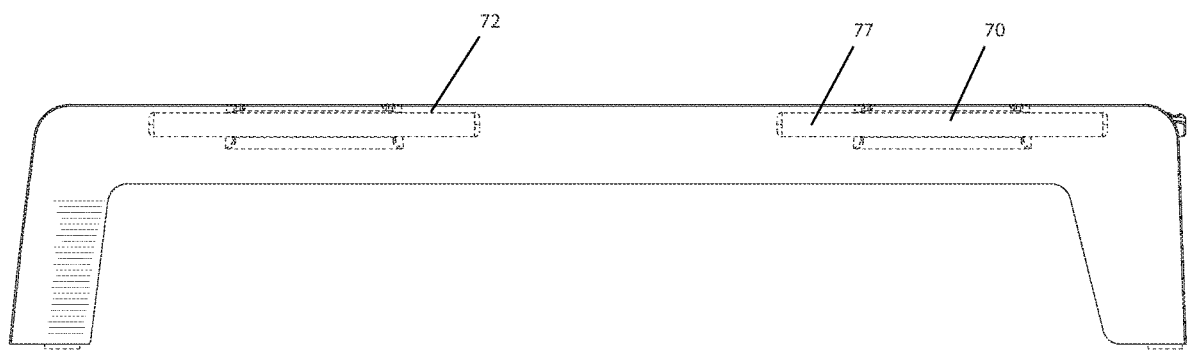
FIG. 9 is a side view of FIG. 6 with the legs removed along lines 7-7.
Figure 10A:
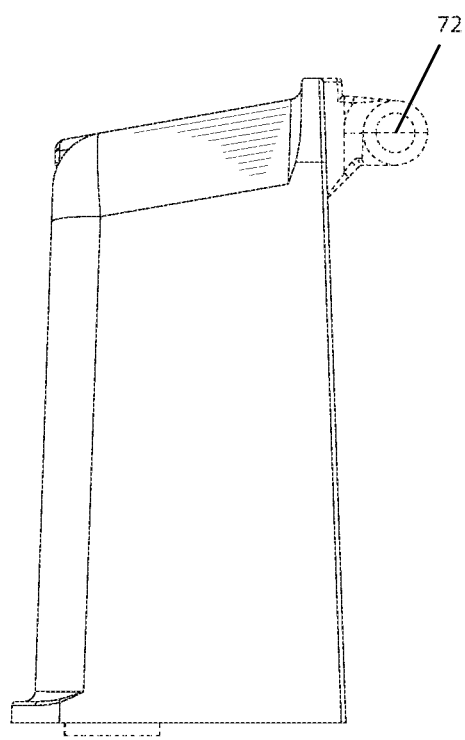
FIGS. 10a-10b are left and right end views of the foldable legs separated from the plan cooking surface at hinge points along lines 7-7 of FIG. 6.
Figure 10B:
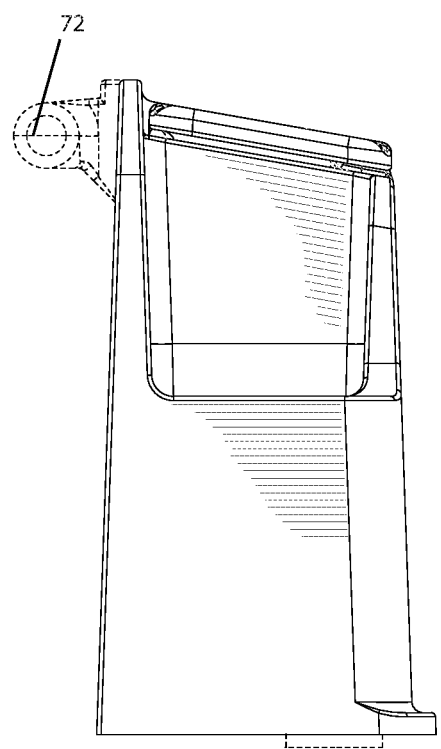
Figure 11:
FIG. 11 is front plan view (upside down) of the tray.
Figure 32:
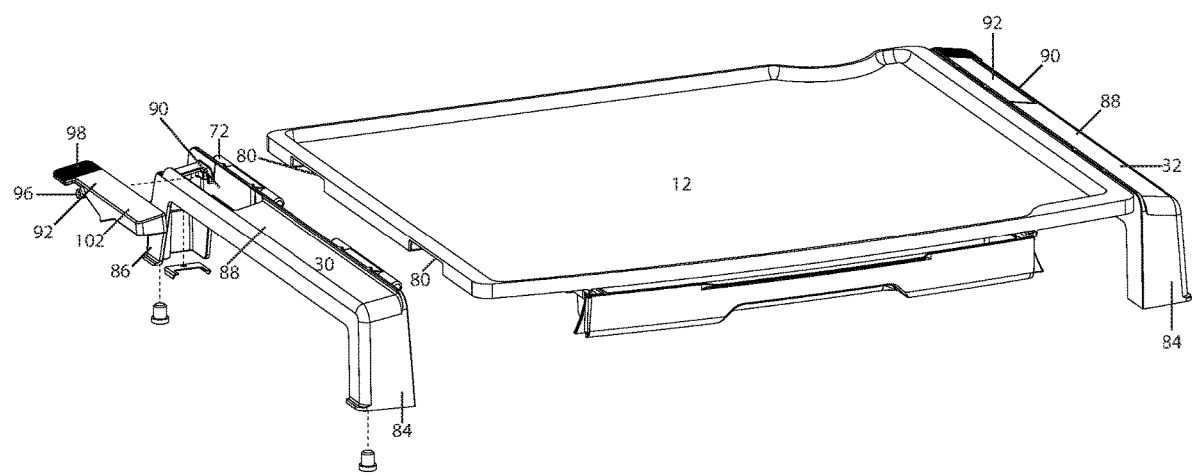
FIG. 32 is a perspective view like FIG. 1 except with one leg and lift lever shown in an exploded view.
Figure 33:
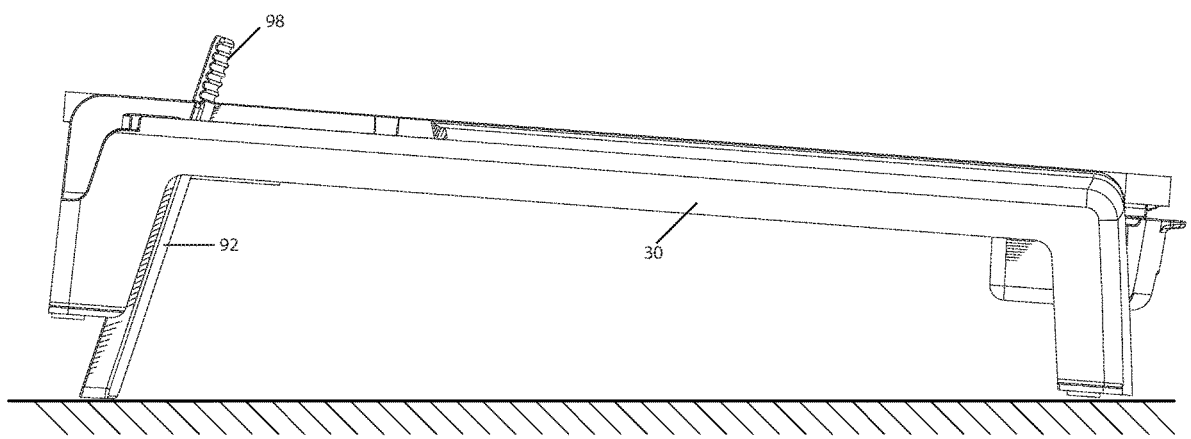
FIG. 33 is a side elevational view of FIG. 29.
Figure 34:
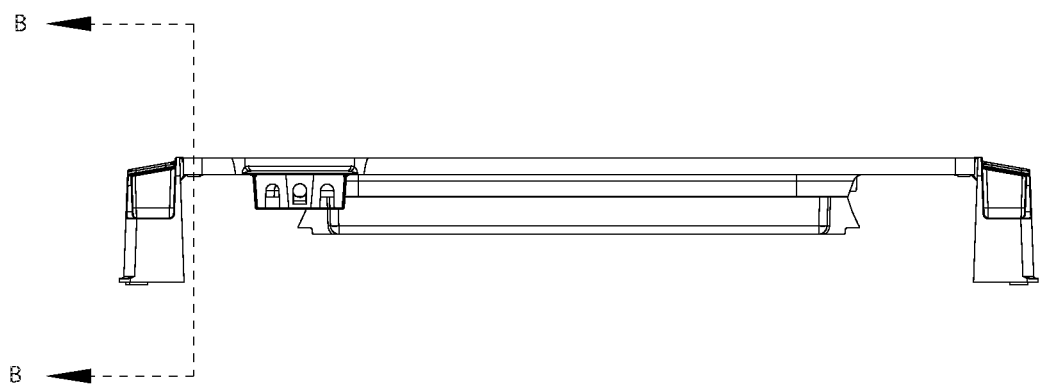
FIG. 34 is a rear elevational rear view of FIG. 1.
Figure 35:
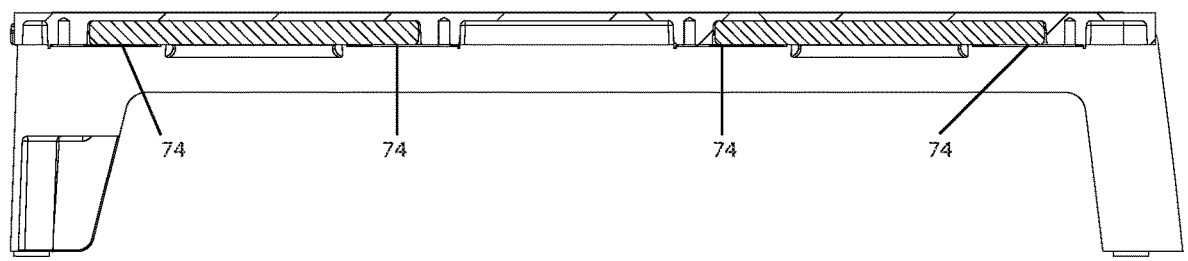
FIG. 35 is a side elevation of view taken along lines B-B of FIG. 34 looking into the leg.
Figure 36A:
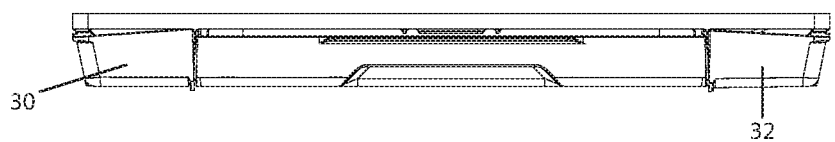
FIGS. 36a, 36b, 36c, 36d, and 36e are front elevational views of the portable cooking surface with its legs in progressive states of unfolding from a fully compact position in FIG. 36a, to a fully extended position in FIG. 36e.
Figure 36B:
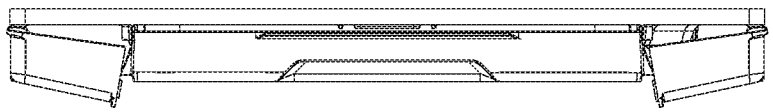
Figure 36C:
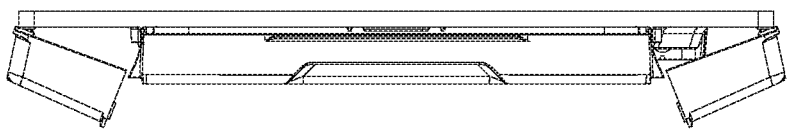
Figure 36D:
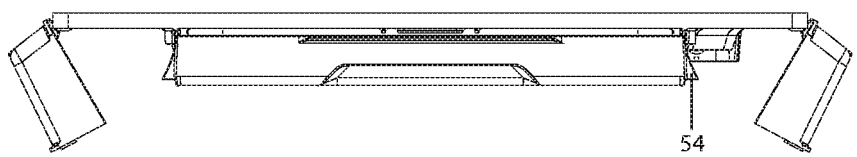
Figure 36E:
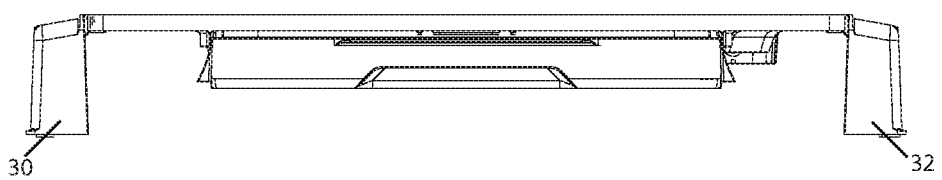

Legs 30, 32, which are mirror images of each other, include hinges 70 (FIG. 7) which have molded hinge pins 72, formed in the legs themselves, or they may be attached elements. Pin 72 are received troughs 80 (FIG. 32) and then the troughs cover at least partially covered by removable plates 74 (FIG. 35) which hold the pins in the trough.

FIGS. 32-35 show leg 30, 32 having a front foot 84 and a rear foot 86. Joining the front and rear feet is a bridging portion 88. In the face of portion 88 adjacent the rear foot is a rectangular aperture 90 which receives a lift/tilt lever 92 which, when operated lifts the cooking surface of its rear feet 86 and thereby raises the cooking surface 12. This allows cooking oils etc. to flow into port 18 and the drip tray 40. A close up of the tilt lever is shown also in FIG. 17.

Figure 29:
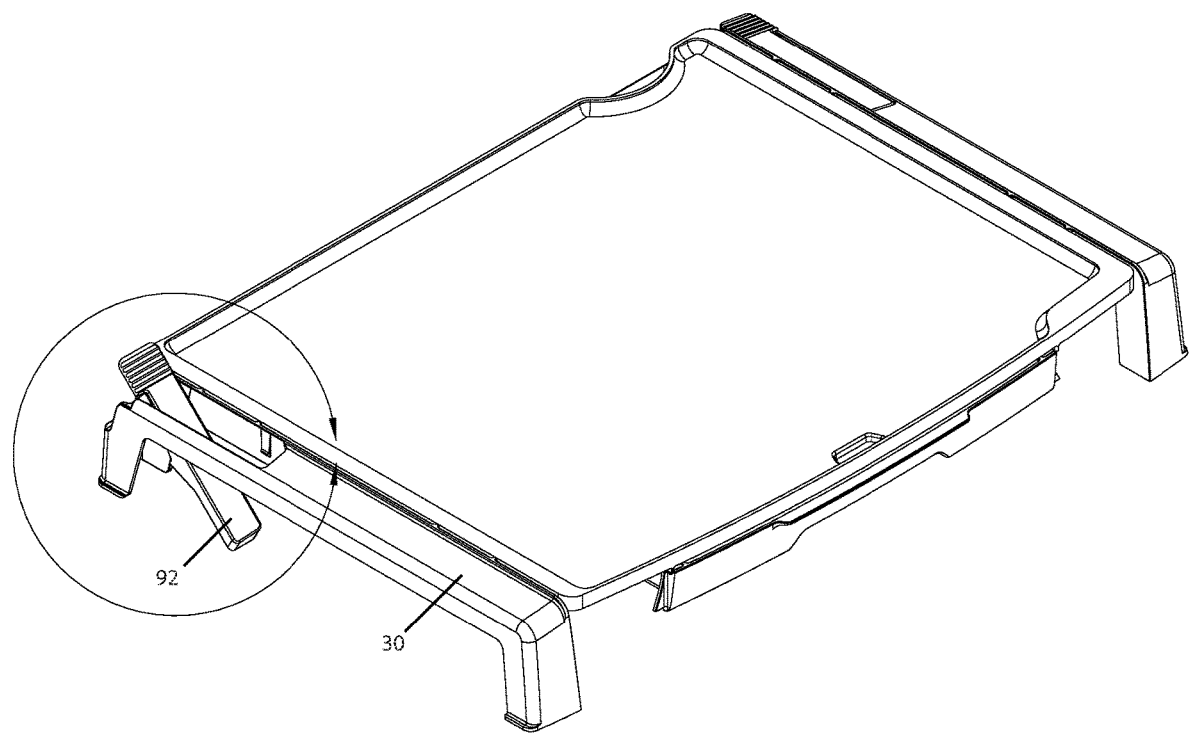
FIG. 29 is a perspective view with one lift lever partially engaged.
Figure 30:
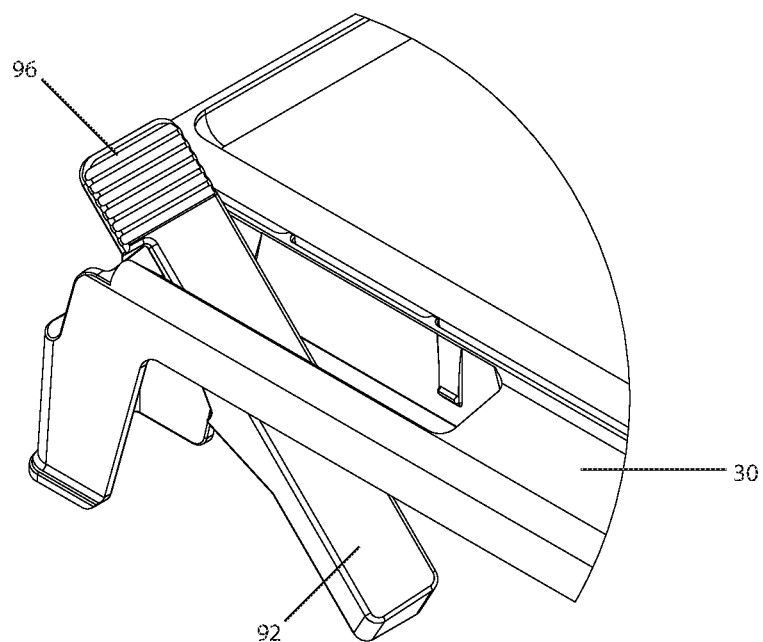
FIG. 30 is a close up view of a portion of FIG. 29.
Figure 31:
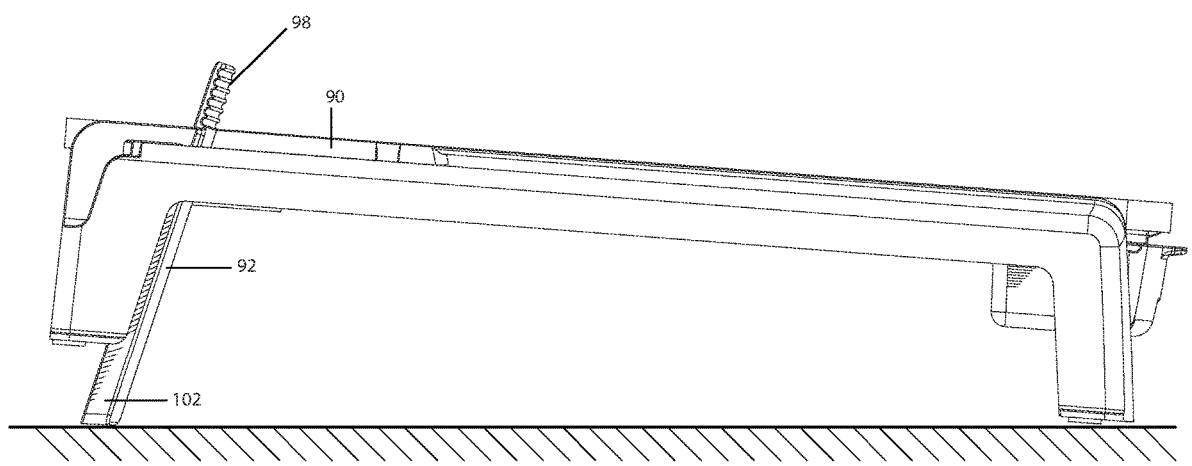
FIG. 31 is a side elevational view of a lift lever fully engaged.

Tilt lever 92 pivots from its storage position (FIG. 32) to lifting position (FIG. 31), on pivot points 96 on both longitudinal sidewalls. The pivot points 96 are received within like recesses in like sidewalls of aperture 90. The tilt lever 92 has a roughened surface tab 98 proximal rear leg 86. It is to provide a gripping surface to depress or lift the tab to move the distal portion 102 from storage to lift position. FIGS. 29, 30 and 31 show the tilt/lift lever in various positions. In most cases the user will operate both levers to lift the rear of the cooking surface.

Figure 17:
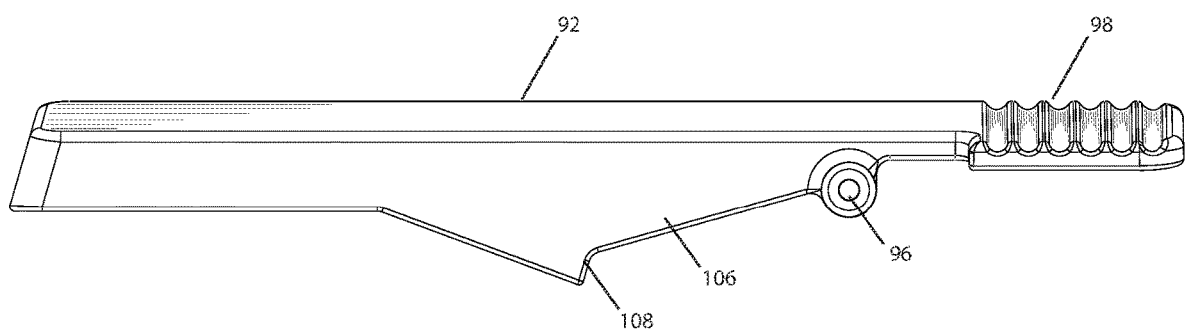
FIG. 17 is a side plan view of the lift lever in FIGS. 16a and 16b.
Figure 18:
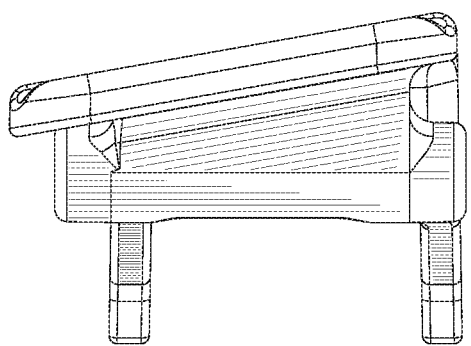
FIG. 18 is a back view of the right side lift lever.
Figure 19:
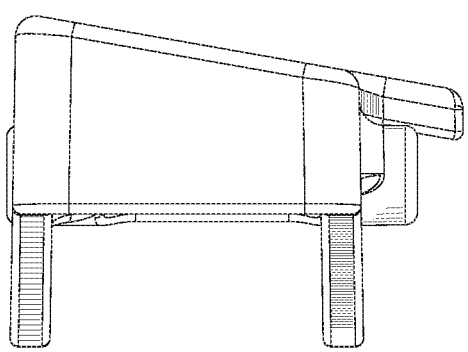
FIG. 19 is a front view of the right side lift lever.
Figure 20:
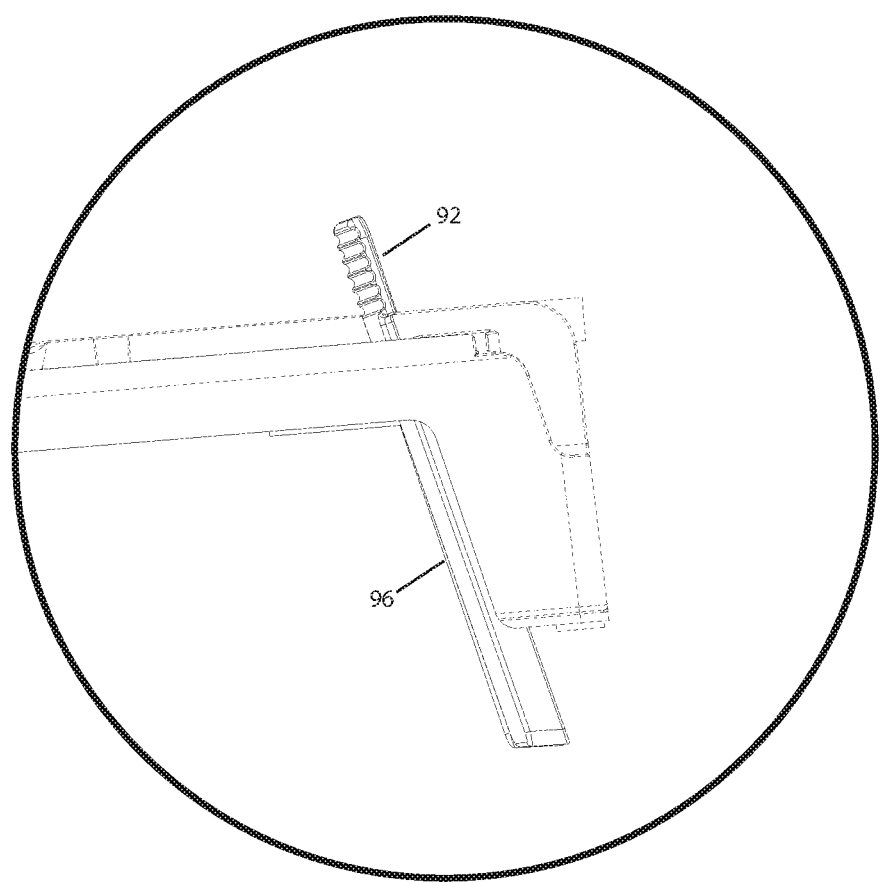
FIG. 20 is a close up side view of a rear leg with the lift ever extended.
Figure 21:
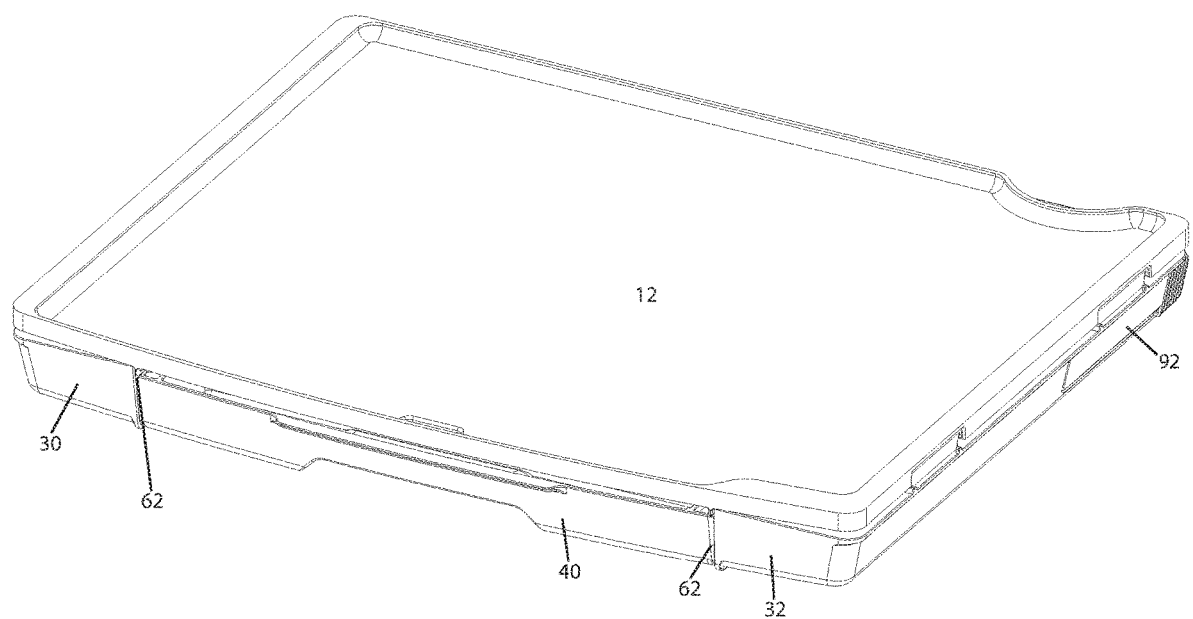
FIG. 21 is a perspective view of FIG. 1 with legs folded under.

As shown in FIG. 17, tilt lever 92 has a wall 106 and a shelf 108 on its bottom side. The placement of these elements in conjunction with the inner underside wall 110 in the rear foot 86 determine the splay and tilt angle of the cooking surface. A preferred angle is sufficient to drain oils but not cause cooking foods to slide off. The preferred tilt angles are approximately 3.5, 4, 4.5 4.6. 5, 5.5, 6, 6.5 degrees, as well as greater than or less than each of these angles.

Figure 6:
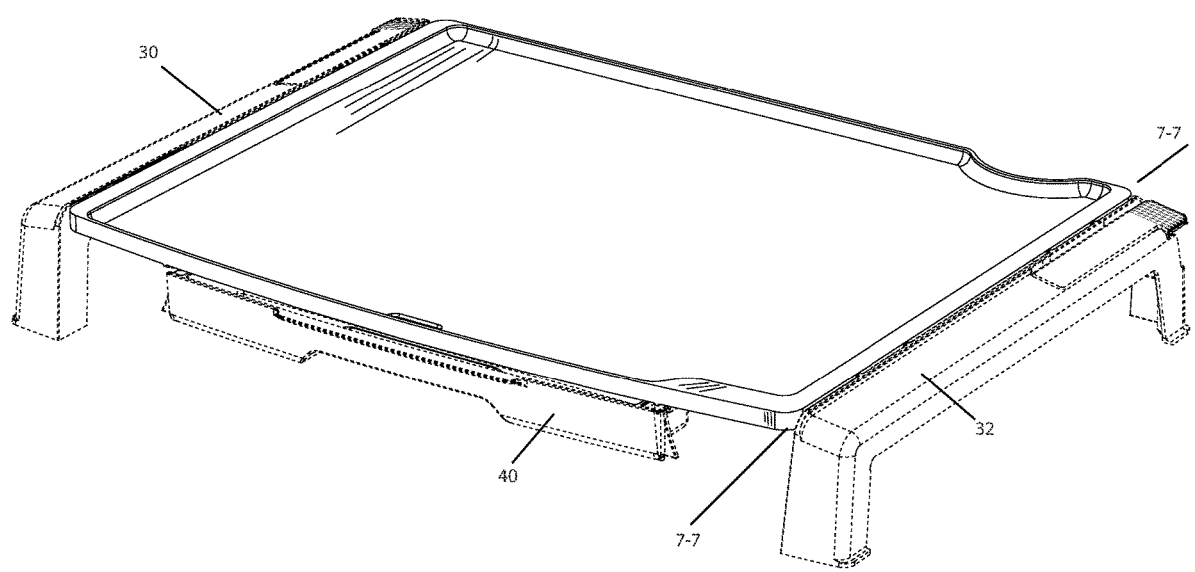
FIG. 6 is a top perspective view of FIG. 1.

When in its storage position, as shown in FIG. 6, tilt levers 92 are held in place by flexible projection arms 110 (FIG. 30) which resiliently extend into the aperture in the leg. The arms have ribs 112 which are located just below the lever when in storage position and must be deflected away to allow the lever to rotate to tilt position. This prevents the levers from switching position accidentally.

A method of lifting a cooking surface is also disclosure which uses the structures above to lift the rear edge of the cooking surface.

A method securing a tray or drawer under a cooking surface which uses the structures described above involving engagement of a flange in either a rotatable leg or the tray which engages a receiving slot in the other of a tray or leg when the leg is moved to a storage position as shown in the figures.

The above description and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A cooktop comprising:
   a. a cooking surface having a top surface, an underside and having front, rear, left and right edges;
   b. left and right support legs being connected to said left and right edges respectively and being moveable between an upright in-use position and a folded under storage position, at least one of said legs being hingeably connected to an edge such that when moved between said in-use and folded under positions its distal edge scribes an arc;
   c. a tray having left and right sides and being slideably attached to said underside; said tray including at least one protruding land extending away from said tray in the direction of one of the left and right edges of the cooking surface;
   d. at least one of said legs having a recess configured to receive and engage at least a portion of said land when said legs are in said folded under storage position.

2. The cooktop of claim 1 wherein said land follows a slope generally equal to the arc of the distal end of the at least one leg.

3. The cooktop of claim 1 wherein said land follows a curved slope from a distal apex of said land to the tray.

4. The cooktop of claim 1 wherein both legs include a land and wherein said lands engage said tray on respective sides thereof.

5. The cooktop of claim 1 wherein said tray includes horizontal flanges on left and rights sides and wherein the underside of said cooking surface includes recesses for receiving said flanges.

6. A cooktop comprising:
   a. a generally planar cooking surface having a top surface, an underside and having front, rear, left and right edges;
   b. left and right support leg members having front and rear legs of predetermined height and a leg surface joining the two legs, said members being connected to said left and right edges respectively;
   c. at least one of the leg surfaces including an aperture therein proximate said edge, and including a tilting structure for elevating one edge of the cooking surface; said tilting structure including:
      i. a lifting arm having a pivot point defining first and second portions of said lifting arm, said arm being sized to fit within said aperture and rotatable between a storage position and a lifting position; said storage position defined as said lifting arm being generally coplanar with said leg surface and said lifting position defined as the second portion being generally proximate the rear leg;
      ii. said first portion of said lifting arm having an extension tab which extends beyond said leg surface when said lifting arm is in the storage position;

iii. said second portion being longer that said predetermined height, so that in said lifting position the cooking surface is raised off its rear leg and is supported by said second portion and the cooking surface is thereby tilted.

7. The cooktop claim 6 wherein said second portion abuts said rear leg when in said tilting position.

8. The cooktop of claim 6 wherein said second portion is non-orthogonal relative to the cooking surface when in said tilting position.

9. The cooktop of claim 6 wherein said second portion is in an oblique splayed angle when in said tilting position.

10. The cooktop of claim 6 wherein said second portion is splayed when in said tilting position.

11. The cooktop of claim 6 wherein said lifting arm is secured into the storage position by lands extending from said leg surface.

12. A method of tilting a cooking surface of a cooktop having a pair of leg members provided at respective edges of the cooking surface, the leg members each having front and rear legs and each leg member having a pivoting tilting member with a tilting member surface and each tilting member capable of moving from a storage position to a lifting position, the method comprising:
   a. configuring the leg members so that they are splayed away from the cooking surface;
   b. rotating a first one of said tilting members so that when said first tilting member is in the lifting position, a first tilting member surface of said first tilting member abuts a first one of said splayed leg members and the first one of the splayed legs thereby provides a stop for a pivoting motion of the tilting member.

13. The method of claim 12, the cooktop further including a drip tray slideably engaged with an underside of the cooking surface and the method further comprising
   configuring the tray to engage a portion of said leg members when said tilting members are in their storage position so that said tray may not slide.

14. The cooktop of claim 1, wherein said of said land is received within and confined by said recess when said at least one leg is rotated through said arc into said folded under position to thereby substantially immobilize said tray.

15. The cooktop of claim 1, further comprising a tilt structure configured to elevate one side of said cooking surface.

16. The cooktop of claim 15, wherein the tilt structure comprises left and right lifting arms that are rotatable about pivot points in the left and right support legs, respectively.

17. The cooktop of claim 6, wherein said lifting arm is secured into the storage position by lands adjacent to said aperture in said leg surface.

18. The cooktop of claim 6, further comprising a removable tray slideably coupled to said underside of said surface.

19. The method of claim 12 wherein rotating the first one of said tilting members includes disengaging said first one of said tilting members from a land in said first leg member.

20. The method of claim 12, wherein configuring the leg members so that they are splayed away from the cooking surface includes rotating said first one of the leg members about a first axis from a folded-under storage position to an in-use position, and wherein rotating the first one of said tilting members includes rotating about a different second axis.

* * * * *